United States Patent Office 3,324,005
Patented June 6, 1967

3,324,005
PROCESS OF PRODUCING RHENIUM FOR TUNG-STEN-RHENIUM ALLOYS BY THE IRRADIATION OF TUNGSTEN
Edward F. Miller, Rockville, Md., assignor to the United States of America as represented by the United States Atomic Energy Commission
No Drawing. Filed Dec. 10, 1964, Ser. No. 419,272
5 Claims. (Cl. 176—10)

This invention relates to a method of producing rhenium for tungsten-rhenium alloys by the irradiation of tungsten.

The high temperatures encountered in certain applications of nuclear and space engineering, as well as critical requirements in the rapidly advancing fields of electronics and high-temperature measuring devices have given considerable impetus in recent years to an exhaustive evaluation of refractory metals which may be alloyed with tungsten. Most of the abundantly occurring metallic elements which have been investigated as alloying agents have displayed one or more undesirable characteristics which have made them unsuitable for certain necessary application. The rare refractory metal, rhenium, possesses a number of desirable high temperature characteristics which produce beneficial properties in tungsten alloys. Rhenium metal possesses excellent high temperature resistance to oxygen and hydrogen, and the high temperature ultimate shear strength of rhenium is considerably better than that of tungsten. By alloying tungsten with rhenium, an alloy may be produced which has excellent resistance to corrosive gases with no sacrifice in its tensile strength.

Inasmuch as rhenium is rare and expensive, new methods for its production have been sought by workers in the art. As a result of the present research, a novel method has been discovered whereby rhenium for tungsten-rhenium alloys can be produced by the neutron irradiation of tungsten metal. By this advanced technological process, a tungsten-rhenium mixture can be produced from tungsten metal.

It is, therefore, the primary object of this invention to produce tungsten-rhenium mixtures by use of neutron irradiation techniques, including resonated neutrons, for subsequent melting and casting and fabricating into tungsten-rhenium alloys.

Other and further objects will become apparent from the following disclosure and examples.

The process according to this invention is initiated by isotopically separating tungsten-186 from the other tungsten isotopes, notably tungsten-182, tungsten-183, and tungsten-184. Various methods of isotopic separation can be used, such as gaseous diffusion, ultracentrifugation or electromagnetic separation in a calutron. The choice of separation methods would be governed by the economics and the equipment available.

The tailings of the described gaseous diffusion isotopic separation are composed substantially of tungsten-186 which occurs in a natural abundance of 28.4% and exhibits a neutron cross-section of about 40 barns. Exposure of these tungsten-186 tailings to a high neutron flux will result in transmutation of some of the tungsten-186 to rhenium-187 according to the following reaction:

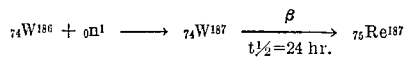

A small amount of osmium-188 will also be formed according to the reaction:

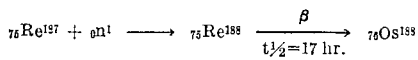

The amount of osmium formed, however, will be small since rhenium-187 has a neutron cross-section of only 1.25±0.75 barns, and the neutron capture and subsequent decay will produce only minute quantities of osmium metal.

To further illustrate the advantages of my invention, in a field of reactor thermal flux density corresponding to $10^{14}$ neutrons per square centimeter per second, the rhenium-187 produced per kilogram of tungsten-186 exposed in this field is in the order of:

Table I

| Irradiation time, (Days): | Re-187 produced (Grams) |
|---|---|
| 2 | 1.2 |
| 5 | 2.2 |
| 10 | 4.0 |
| 20 | 7.5 |
| 30 | 10.9 |

Variation of the thermal neutron flux density on tungsten-186 also affects the production of rhenium-187. The following table shows the calculated production of rhenium-187 based on a 30-day irradiation exposure of a kilogram of tungsten-186 at various thermal neutron flux densities:

Table II

| Thermal neutron flux (n./cm.²/sec.): | Re-187 produced (Grams) |
|---|---|
| $5 \times 10^{13}$ | 5.5 |
| $1 \times 10^{14}$ | 10.9 |
| $5 \times 10^{14}$ | 52.7 |

From the two tables above, it can readily be seen that the quantity of rhenium-187 formed will be directly proportional to the thermal neutron flux density and the length of the time tungsten-186 is exposed to the neutron flux.

While the present process may be effected in the presence of any neutron source, a reactor designed especially for the purpose of rhenium production according to this process would greatly enhance the efficiency of manufacture. The energy requirements of the reactor may be determined from an inspection of the average neutron cross-section of tungsten. In the slow neutron region, the neutron absorption cross-section decreases with increases in the neutron energy. However, significant resonance peaks exist in the epi-thermal region for the tungsten-186 isotope. At an energy level of 19 electron volts (e.v.) tungsten-186 exhibits a peak of 50,000 barns and at 171 e.v. the isotope has a neutron cross-section of 1070 barns. Thus, by exposing tungsten-186 to a neutron energy level of 171 e.v., the neutron capture is high and the efficiency of the transmutation to rhenium would be increased significantly. Similarly, the efficiency of the transmutation would be even higher upon exposing tungsten-186 to a neutron energy level of 19 e.v.

Having thus described the present invention with a certain degree of particularity, it is to be understood that various changes and modifications may be made in the subject process without departing from the scope of the invention as set forth in the following claims.

I claim:
1. A process for the production of rhenium for tungsten-rhenium alloys comprising the separation of the tungsten-186 isotope from naturally occurring tungsten metal, bombarding the tungsten-186 with thermal energy neutrons in a flux density of at least $10^{14}$ neutrons per square centimeter per second, and allowing the irradiated metal to decay to yield tungsten-rhenium mixtures.

2. A process for the production of rhenium for tungsten-rhenium alloys comprising the separation of the tungsten-186 isotope from naturally occurring tungsten metal, exposing said isotope to neutrons of 19 electron volt energy level in a flux density of at least $10^{14}$ neutrons per square centimeter per second, and allowing the metal to decay to yield tungsten-rhenium mixtures.

3. A process for the production of rhenium for tungsten-rhenium alloys comprising the separation of the tungsten-186 isotope from naturally occurring tungsten metal, exposing said isotope to neutrons of 171 electron volt energy level in a flux density of at least $10^{14}$ neutrons per square centimeter per second, and allowing the metal to decay to yield tungsten-rhenium mixtures.

4. The process according to claim 1 in which the rate of transmutation of tungsten to rhenium is proportional to the length of time in which the tungsten is exposed to the neutron flux.

5. The process according to claim 1 in which the rate of transmutation of tungsten to rhenium is proportional to the density and energy of the neutron flux in which the tungsten is exposed.

No references cited.

L. DEWAYNE RUTLEDGE, *Primary Examiner.*

CARL D. QUARFORTH, *Examiner.*

H. E. BEHREND, *Assistant Examiner.*